(12) United States Patent
Calame et al.

(10) Patent No.: US 12,447,648 B2
(45) Date of Patent: Oct. 21, 2025

(54) MANUFACTURE OF A HOROLOGY COMPONENT

(71) Applicant: ROLEX SA, Geneva (CH)

(72) Inventors: Florian Calame, Epalinges (CH); Xavier Multone, Lausanne (CH)

(73) Assignee: ROLEX SA, Geneva (CH)

( * ) Notice: Subject to any disclaimer, the term of this patent is extended or adjusted under 35 U.S.C. 154(b) by 650 days.

(21) Appl. No.: 16/893,240

(22) Filed: Jun. 4, 2020

(65) Prior Publication Data
US 2020/0384669 A1    Dec. 10, 2020

(30) Foreign Application Priority Data
Jun. 7, 2019  (EP) ..................................... 19178963

(51) Int. Cl.
*G03F 7/00* (2006.01)
*B29C 33/38* (2006.01)
(Continued)

(52) U.S. Cl.
CPC .......... *B29C 33/3842* (2013.01); *B29C 33/40* (2013.01); *C25D 1/003* (2013.01);
(Continued)

(58) Field of Classification Search
CPC .... G03F 7/0017; G03F 7/0027; G03F 7/0015; G03F 7/0035
See application file for complete search history.

(56) References Cited

U.S. PATENT DOCUMENTS 5,348,616 A    9/1994  Hartman et al.
5,576,147 A  * 11/1996  Guckel ................. B81C 1/0038
                                                                430/323
(Continued)

FOREIGN PATENT DOCUMENTS

CN      101517130 A    8/2009
CN      105717753 A    6/2016
(Continued)

OTHER PUBLICATIONS

European Search Report and Written Opinion dated Dec. 18, 2019 issued in counterpart application No. EP19178963; with English machine translation (total 15 pages).
(Continued)

*Primary Examiner* — Daborah Chacko-Davis
(74) *Attorney, Agent, or Firm* — Seckel IP, PLLC

(57) ABSTRACT

Method for manufacturing by photolithography a resin multilayer mould (10; 10') including a cavity (11; 11') provided with an inlet (110; 110') for the manufacture of a horological component, including producing at least two resin layers of the mould (10; 10'), by producing a first resin layer (C10; C20') having a first through-opening or open opening (111; 111') oriented in the direction of the inlet (110; 110') of the mould to delimit a first volume of the cavity (11; 11') of the mould (10, 10'), and producing a second resin layer (C20; C30') including a rigid film and having a second through-opening (112; 112') that delimits a second volume of the cavity (11; 11') of the mould (10, 10') and is at least partly superposed on the first through-opening or open opening (111; 111'), the second resin layer partly covering that same first through-opening or open opening (111; 111').

22 Claims, 10 Drawing Sheets

(51) Int. Cl.
    *B29C 33/40*    (2006.01)
    *C25D 1/00*     (2006.01)
    *G04B 13/02*    (2006.01)
    *G04D 3/00*     (2006.01)
    *B29L 31/00*    (2006.01)

(52) U.S. Cl.
    CPC ........... *G03F 7/0017* (2013.01); *G04B 13/02* (2013.01); *G04D 3/0071* (2013.01); *B29L 2031/739* (2013.01)

(56) References Cited

U.S. PATENT DOCUMENTS

| | | |
|---|---|---|
| 8,070,970 B2 | 12/2011 | Saucy |
| 10,088,748 B2 | 10/2018 | Calame |
| 10,359,738 B2 | 7/2019 | Bossart et al. |
| 2004/0156478 A1 | 8/2004 | Appleby et al. |
| 2009/0081476 A1 | 3/2009 | Saucy |
| 2010/0288643 A1 | 11/2010 | Niwa et al. |
| 2011/0079100 A1 | 4/2011 | Cusin et al. |
| 2014/0041477 A1 | 2/2014 | Cusin et al. |
| 2016/0179000 A1 | 6/2016 | Calame |
| 2017/0220004 A1 | 8/2017 | Bossart et al. |
| 2019/0294118 A1 | 9/2019 | Bossart et al. |

FOREIGN PATENT DOCUMENTS

| | | |
|---|---|---|
| EP | 2004881 A2 | 12/2008 |
| EP | 2405301 A1 | 1/2012 |
| EP | 3202708 A1 | 8/2017 |
| EP | 2004881 B1 | 10/2017 |
| EP | 3454122 A1 | 3/2019 |
| EP | 3454122 B1 | 2/2020 |
| JP | 2008208431 A | 9/2008 |
| JP | 2011079130 A | 4/2011 |
| JP | 2014177711 A | 9/2014 |
| WO | 2007104171 A2 | 9/2007 |

OTHER PUBLICATIONS

"Swiss watches with Karlsruhe technology", in DGC Mitteilungen, German Society for Chronometry, No. 104, 2005, pp. 21-23 (with English machine translation, total 6 pages) (cited in the Specification).
A. B. Frazier et al., "Metallic microstructures fabricated using photosensitive polyimide electroplating molds," J. Microelectromech. Syst., vol. 2, No. 2, Jun. 1993, pp. 87-94 (in English; cited in the Specification).
Chinese Office Action and Search Report dated Feb. 28, 2024 in counterpart application No. CN202010503079.5; with English machine translation (total 16 pages).
Japanese Office Action dated Jun. 4, 2024 in counterpart application No. JP 2020-095819; with English translation (total 12 pages) (note: JP2008208431, D1 cited in the JP Office Action, is not listed in this IDS since it is already of record).
European Office Action dated Feb. 1, 2024 in counterpart application No. EP19178963.5; with English machine translation (total 13 pages).

\* cited by examiner

MANUFACTURE OF A HOROLOGY COMPONENT

This application claims priority of European patent application No. EP19178963.5 filed Jun. 7, 2019, the content of which is hereby incorporated by reference herein in its entirety.

The present invention concerns a method for manufacturing a horological component. It also concerns a method for manufacturing a mould intended to be used in said method for manufacturing a horological component. It also relates to a mould as such.

DGC Mitteilungen No. 104, 2005 mentions the use of the LIGA (Lithographie Galvanik Abformung: technology invented by W. Ehrfeld of the Karlsruhe Nuclear Research Centre, Germany) for the manufacture of high-precision horological metal parts such as, for example, pallets or escape wheels. That process comprises the formation of an X-ray sensitive resin mould by irradiation with a high-energy beam of X-rays specifically generated by a synchrotron, which may represent a disadvantage in terms of equipment.

A. B. Frazier et al., Journal of Microelectromechanical systems, 2, 2, June 1993 describes the manufacture of metal structures by electrodeposition of metal in photosensitive resin (photoresist) moulds based on polyimide, prepared by a method using a so-called LIGA-UV technology, analogous to the LIGA technology mentioned hereinabove but with UV illumination of the resin instead of irradiation with X-rays.

Patent applications EP2004881 and EP2405301 describe for example solutions using this kind of technology to manufacture complex metal horological components, in particular multilevel horological components.

These existing solutions enable the manufacture of horological components with good definition. However, these existing methods often necessitate more or less laborious finishing steps that complicate the manufacturing process, particularly if the geometry of the component is elaborate.

Accordingly, an object of the present invention is to propose an improved solution for manufacturing a horological component.

More specifically, one object of the invention is to be able to manufacture a horological component of complex geometry, such as a shaft pinion, enabling a sufficient definition to be achieved, in particular a sufficient surface state, on all of the functional surfaces, in particular on the functional surfaces of the pinion, to enable it to fulfil its function efficaciously. By "functional surface of the pinion" we mean in particular a surface participating in the gearing function of the pinion. It may be a surface of a tooth, for example a lower or upper surface of a tooth. By "pinion" we mean any toothed component having a gearing function.

To this end, the invention concerns a method for manufacturing by photolithography a resin multilayer mould including a cavity provided with an inlet for the manufacture of a horological component, including the following substeps for producing at least two resin layers of the mould:

Substeps for producing a first resin layer including a first through-opening or open opening oriented in the direction of the inlet of the cavity of the mould to delimit a first volume of the cavity of the mould;

Substeps for producing a second resin layer including a rigid film, said second layer including a second through-opening delimiting a second volume of the cavity of the mould, the second through-opening in this second layer being at least partly superposed on the first through-opening or open opening of the first layer and the second resin layer partly covering that same first through-opening or open opening in the first resin layer.

The invention also relates to a method for manufacturing a horological component including a first step for manufacturing a mould by the method of manufacture described hereinabove and a second step of at least partial filling of the cavity of the mould manufactured in the preceding step, in particular of filling the first and second volumes of said cavity of said mould in order to manufacture all or part of the horological component.

The invention also relates to a resin multilayer mould including a cavity having an inlet, produced by photolithography, for the manufacture of a horological component, including:

A first resin layer including a first through-opening or open opening oriented in the direction of the inlet of the cavity of the mould delimiting a first volume of the cavity of the mould;

A second resin layer including a rigid film, said second layer including a second through-opening delimiting a second volume of the cavity of the mould, the second through-opening in this second layer being at least partly superposed on the first through-opening or open opening in the first layer and the second resin layer partly covering that same first through-opening or open opening of the first resin layer.

The invention is more particularly defined by the claims.

These objects, features and advantages of the invention will be disclosed in detail in the following description of particular embodiments given non-limitingly with reference to the appended figures, in which.

The invention is based firstly on a first step that consists in a particularly advantageous method for manufacturing a multilayer mould that will afterwards in a second step enable manufacture of a horological component.

The various substeps of a first step E1 of manufacturing a mould in accordance with one embodiment will now be described.

Figure 1:
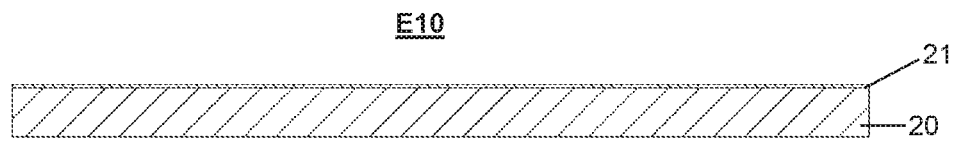
FIGS. 1 to 7 represent diagrammatically different steps of a method in accordance with a first embodiment of the invention for manufacturing a resin multilayer mould by photolithography for the manufacture of a horological component.

The first substep E10, shown in FIG. 1, consists in making available a substrate 20. This substrate may consist of a metal wafer, in particular made of an alloy such as a stainless steel, or of silicon, or of glass, or of a ceramic. This substrate may equally include structures produced by microfabrication. It is prepared in accordance with the rules known to the person skilled in the art, in particular for degreasing, cleaning and where applicable passivation and/or activation thereof. This substrate is advantageously planar. Alternatively, it may include patterns, in particular machined patterns, and/or cavities and/or other structures in accordance with the teachings of the prior art. The substrate is preferably provided with markings so that it can be positioned very precisely during various steps. The substrate 20 is made of a conductive material, for example stainless steel. Alternatively a semiconductor material substrate could also be used, for example silicon, or even an electrical insulator, such as for example a ceramic.

As shown in FIG. 1, a conductive layer 21 is optionally deposited on the substrate 20, for example by thermal evaporation. This conductive layer 21 is in particular intended to play the role of an electrode for initiating galvanic deposition, electrodeposition or electroforming, during execution of the step E2. In known manner, this starting conductive layer 21 may comprise a sublayer of chromium, nickel or titanium covered with a layer of gold or copper, and may thus take the form of a multilayer structure.

The aforementioned substrate serves as a support for the manufacture of the mould that will now be described in detail. To simplify the description, we will use the adjective "longitudinal" to designate one of the directions parallel to the plane of the substrate and the adjective "vertical" to designate one of the directions perpendicular to the plane of the substrate. The mould will be constructed by stacking a plurality of longitudinal layers in the vertical direction. Similarly, we will use the adjective "upper" to designate a zone or a surface superposed on a "lower" zone or surface on the substrate side relative to the vertical direction.

Figure 2:
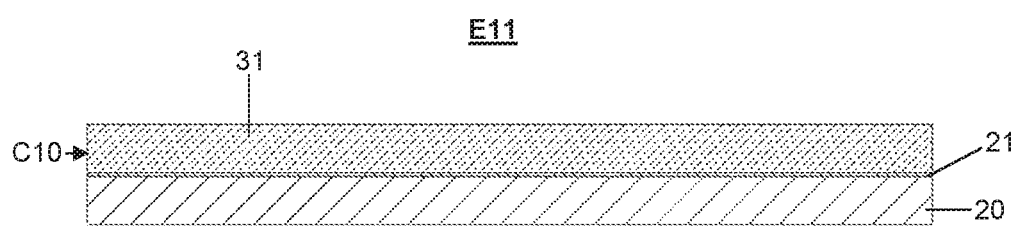
Figure 10:
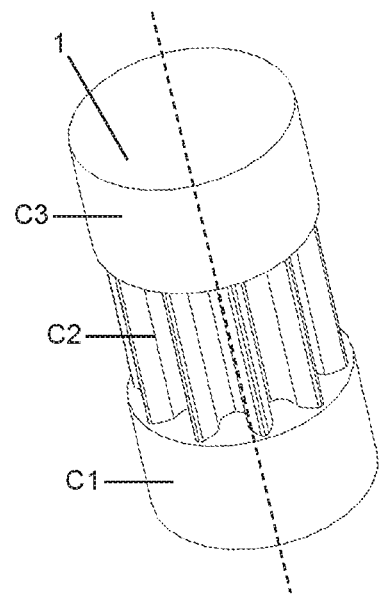
FIG. 10 represents specifically by way of example a horological component produced by the manufacturing method in accordance with the first embodiment of the invention.

In a second substep E11 shown in FIG. 2 the substrate 20, in particular the optional conductive layer 21, is covered with a first layer C10 of a first photosensitive resin 31 to a defined height corresponding or substantially corresponding to the height of a portion C1 of the horological component 1 to be manufactured, as will be described in detail hereinafter with reference to FIG. 10. This resin is deposited in accordance with rules known to the person skilled in the art, for example by spin coating.

The first resin 31 is a photosensitive resin suited to photolithography. This resin may be negative or positive. In the first case it is designed to become insoluble or difficult to dissolve using a developer and the action of radiation (i.e. the exposed zones resist development) whereas, in the second case, it is designed to become soluble using a developer and the action of radiation, while the part not exposed to the radiation remains insoluble or difficult to dissolve. In an advantageous variant embodiment of the second substep E11, the resin 31 used is of "SU-8" type, which is a negative photosensitive resin that is polymerized by the action of UV radiation, for example the Microchem SU-8-100 resin.

Alternatively, the first resin 31 may take the form of a dry resin film that is applied to the substrate 20, in particular to the optional conductive layer 21, so as to define a first layer C10 of a first photosensitive resin 31. This dry film is in particular applied by a lamination process. This dry resin film may for example be a SUEX or ADEX film from DJ Microlaminates Inc. or a TMMF S2000 film from Tokyo Ohka Kogyo Co. These three films are negative dry resin films.

Figure 3:
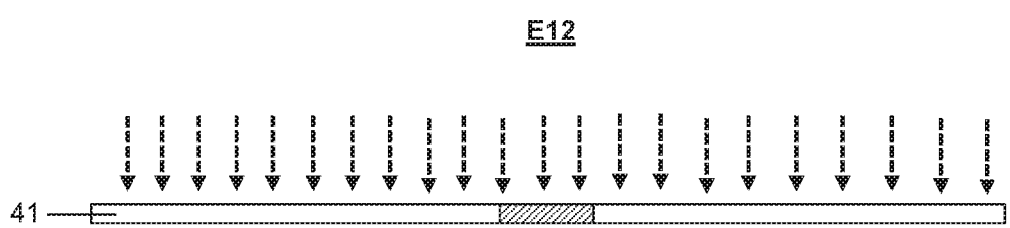
Figure 3:
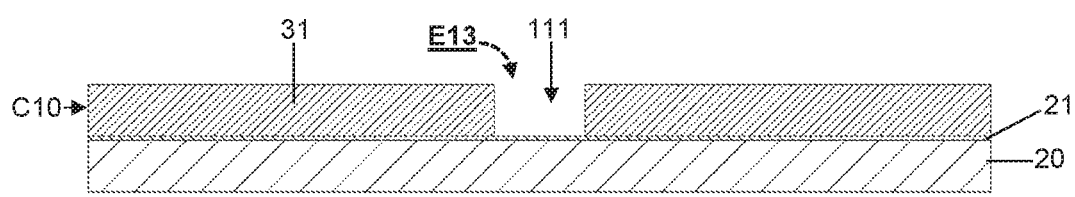

A third photolithography substep E12 illustrated by FIG. 3 is then carried out on the resin layer 31. The latter consists in exposing to luminous radiation or to light the first layer C10 of the first resin 31 through a first mask 41 comprising openings and opaque zones. This mask defines the pattern to be produced to produce the portion of the horological component corresponding to the height of this first layer. Here the luminous radiation used to irradiate or expose the resin 31 is UV radiation. Nevertheless there may be envisaged using X-rays, an electron beam (the expression electron beam lithography is then used) or any type of radiation suited to the resin used. The radiation is perpendicular to the plane in which the mask extends so as to irradiate only the zones of the resin situated in line with openings formed in the mask. These zones are therefore defined by vertical or substantially vertical walls, namely walls perpendicular or substantially perpendicular to the plane of the substrate 20. Alternatively, a transmittance variation mask may be used so as to form non-vertical or inclined walls of said zones.

This substep E12 is optionally followed by a step of thermal cross-linking treatment of the resin 31.

A fourth development substep E13 illustrated in FIG. 3 is then carried out. In the example shown, the first layer C10 of the first resin 31 is therefore dissolved locally to form in the resin a first open opening 111. By "open opening" we mean an opening that opens on the outside in the direction of an inlet 110 of a cavity 11 of the mould, as will be explained hereinafter. Moreover, an opening of this kind has a bottom in the direction opposite that of the inlet 110 of the cavity 11 of the mould. Alternatively, the first layer C10 could naturally comprise a plurality of openings. In the case of this example, in which the resin 31 is negative, development consists in eliminating the unexposed zones of resin using a method suited to the resin 31, for example by dissolving it with a chemical product or by means of a plasma process. In the case of a positive photosensitive resin that could be used instead, the exposed zones are eliminated during development, for example chemically, and the unexposed zones remain on the substrate. Following dissolution, the substrate 20 or the optional conductive layer 21 would be exposed at locations where the first resin 31 has been eliminated.

The remaining parts of the first resin 31 therefore form a first layer C10 of the mould 10, as will be explained hereinafter, that includes a first volume formed by the first opening 111. The bottom of that opening is delimited either by the substrate 20 or where applicable by the conductive layer 21.

Figure 4:
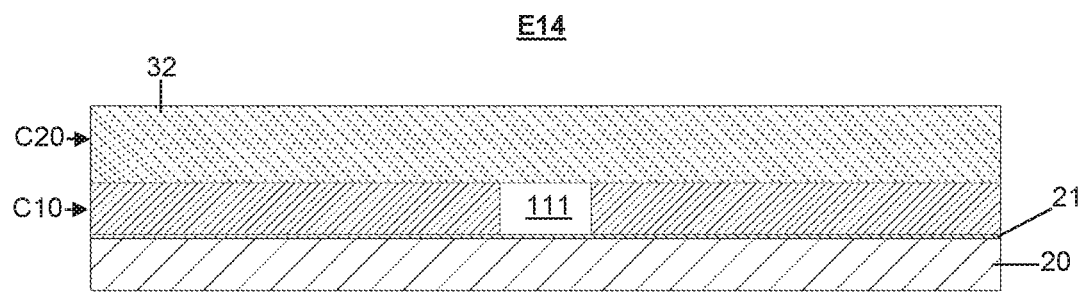

A fifth substep E14 illustrated by FIG. 4 consists in covering the first layer C10 of the first resin 31 with a second layer C20 of a second resin 32.

This second resin 32 has the specific feature of taking the form of a dry film that is applied to the first layer C10 so as to define a second layer C20 of the second photosensitive resin 32 the height of which corresponds or substantially corresponds to the height of a second layer C2 of the horological component to be manufactured, as will be described in detail with reference to FIG. 10. This dry film is in particular applied by lamination.

Because of its rigidity, the use of a film of this kind advantageously enables precise position of the second resin 32 on top of the first opening 111 in the first layer of the first resin, in particular in the vertical direction. A film of this kind is advantageously self-supporting, that is to say its geometrical integrity is assured by its stiffness alone. In other words, a film of this kind is rigid. In accordance with this embodiment the modulus of elasticity of a film of this kind is more particularly between 2 and 5 GPa inclusive (at 20° C.). The use of a film of this kind therefore advantageously enables the formation of a second layer C20 of the second resin 32 a longitudinal surface of which is not entirely superposed on a longitudinal surface of a first layer C10 of the first resin 31 during the fifth substep E14. A longitudinal surface of this kind not entirely superposed on a longitudinal surface of a first layer C10 of the first resin 31 is advantageously not deformed by the effect of gravity in its part that is not supported by the first layer and can therefore be positioned precisely, in particular in the vertical direction.

The film of resin may be for example a SUEX or ADEX film from DJ Microlaminates Inc. or a TMMF S2000 film from Tokyo Ohka Kogyo Co. The thickness of the film may be between 100 μm and 1 mm inclusive.

Figure 5:
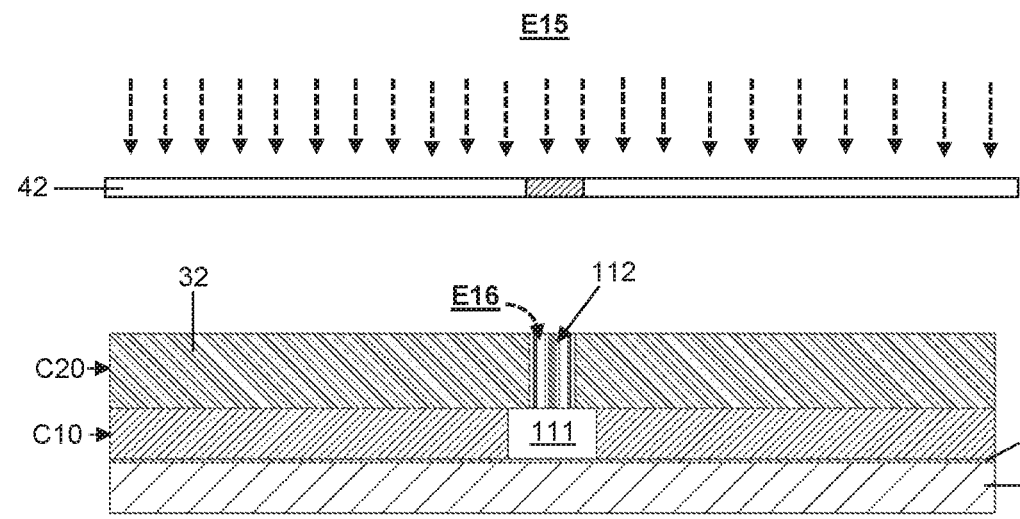

A sixth substep E15 illustrated by FIG. 5 of photolithographic treatment of the second layer of the second resin 32 is then carried out. The latter consists in exposing to luminous radiation or to light the second layer of the second resin 32 through a second mask 42 comprising openings and opaque zones. This mask defines the pattern to be reproduced to manufacture another portion C2 of the horological component, as will be described in detail hereinafter with reference to FIG. 10.

This substep E15 is optionally followed by a step of thermal cross-linking treatment of the second resin 32.

A seventh, development substep E16 illustrated by FIG. 5 is then carried out. In the case of the example shown, in which the second resin 32 is negative, development consists in eliminating the unexposed zones of the second resin using a method suited to this second resin 32, for example by dissolving it with a chemical product or by means of a plasma process.

In accordance with the example shown of this embodiment, after dissolution a second through-opening 112 is formed in the second layer C20 of the mould, at the location where the resin has been eliminated. This second through-opening 112 is at least partly superposed on the first opening 111. By "through-opening" we mean an opening that passes completely through the layer in which it is formed in a vertical direction. In other words, an opening of this kind opens in particular in the direction of the inlet 110 of the cavity 11 of the mould 10, as will be described in detail hereinafter, and toward the first opening 111. An opening of this kind has no bottom.

The remaining portions of resin therefore form a second layer C20 the second opening 112 in which forms a second volume of the cavity 11 of the mould 10, complementing the first volume formed by the first opening 111.

The resulting geometry has the particular feature that, on the one hand, the second opening 112 through the second layer C20 is superposed on the first opening 111 opening out from the first layer C10, forming a continuous volume of a cavity of a future mould, and, on the other hand, the second layer C20 of resin partly covers this same first opening 111 opening out from the first layer of resin. In other words, the contour of the second layer C20 at the level of the second opening 112 projects inside the vertical elevation of the contour formed by the first opening 111. The dry film of the second resin 32 has sufficient rigidity to support this partial positioning above the void at the level of the first opening 111.

In the embodiment described the two superposed openings 111, 112 are centred, in particular coaxial. The second opening 112 has a surface section less than the section of the first opening 111. Of course, in accordance with an alternative embodiment, the two openings 111, 112 may be at least partly superposed without being centred.

Figure 6:
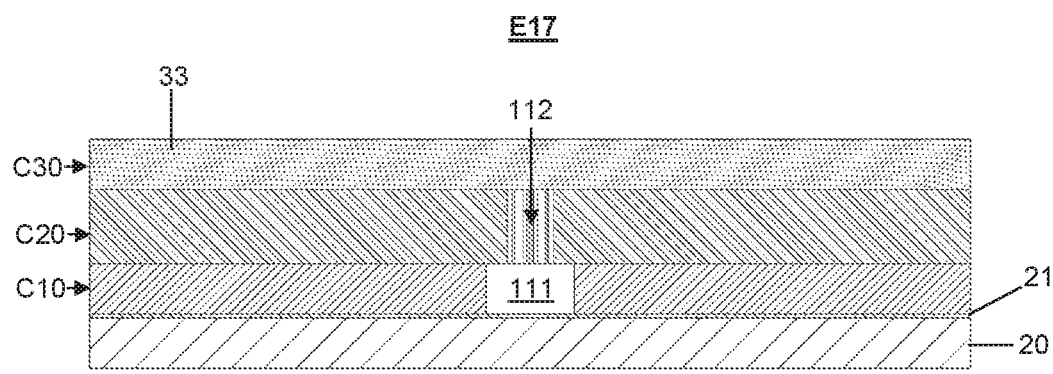

The method for manufacturing a mould in accordance with this first embodiment includes an eighth substep E17 illustrated by FIG. 6 that consists in covering the second layer C20 of the second resin 32 with a top layer C30 of a third resin 33.

This third resin 33 may take the form of a dry film that is applied, in particular by lamination, to the second layer C20 so as to define a third layer C30 of the third resin 33, which is photosensitive, the height of which corresponds or substantially corresponds to the height of the portion C3 of the horological component to be manufactured, as will be described in detail with reference to FIG. 10. Alternatively, this third resin 33 may be deposited to a required height in accordance with rules known to the person skilled in the art, for example by spin coating.

Figure 7:
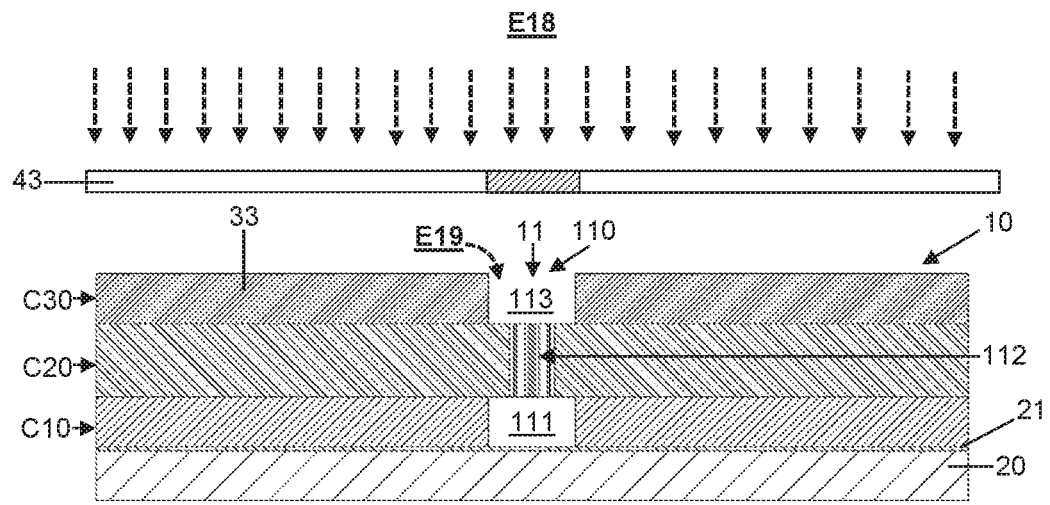

A ninth substep E18 illustrated by FIG. 7 of photolithographic treatment of the third layer of the third resin 33 is then carried out. It consists in exposing to luminous radiation or to light the layer of resin 33 through a third mask 43 comprising openings and opaque zones. In the chosen example, this mask defines the pattern to be reproduced to manufacture the portion of the horological component corresponding to the height of this third layer.

This substep E18 is optionally followed by a step of thermal cross-linking treatment of the third resin 33.

A tenth, development substep E19, also illustrated by FIG. 7, is then carried out. In the case of the example of this embodiment in which the resin 33 is negative, development consists in eliminating the unexposed zones of resin using a method suited to the resin 33, for example by dissolving it with a chemical product or by a plasma process.

The remaining parts of the resin therefore form a third layer C30 of the mould which, in accordance with the chosen example, includes a third through-opening 113 at least partly superposed on the first two openings 111, 112. This third opening forms a third volume of the cavity of the mould.

Thus the three openings 111, 112, 113 are at least partly superposed to form a cavity 11. The steps E10 to E19 result in a multilayer resin mould 10 including a cavity 11 having an inlet 110. The volume of this cavity 11 corresponds to the three volumes respectively corresponding to the three openings 111, 112, 113 of the three layers C10, C20, C30. All or part of this cavity 11 is intended to be filled during a second step E2 described hereinafter.

The invention also relates to a method for manufacturing a horological component using the mould previously formed in accordance with the method for manufacturing a mould that forms the first step E1 of the method in accordance with a first embodiment of the invention for manufacturing the horological component.

The method for manufacturing the horological component then includes a second step E2 the substeps of which will be described in detail hereinafter.

A first substep E20 consists in filling all or part of the cavity of the mould 10 with a metal 12 by electrodeposition, electroforming or galvanic deposition.

The conductive layer 21 or the substrate 20 directly serves as the cathode for starting the substep E20. This substep uses for example the LIGA process and a metal or metal alloy 12 such as for example nickel (Ni) or nickel-phosphorous (NiP). An alloy such as that described in the patent application WO2017102661 may advantageously be employed. This metal or metal alloy 12 is deposited in all or part of the cavity 11 of the mould 10 through its inlet 110, formed on the upper surface of the third opening 113 of the third layer C30.

Figure 8:
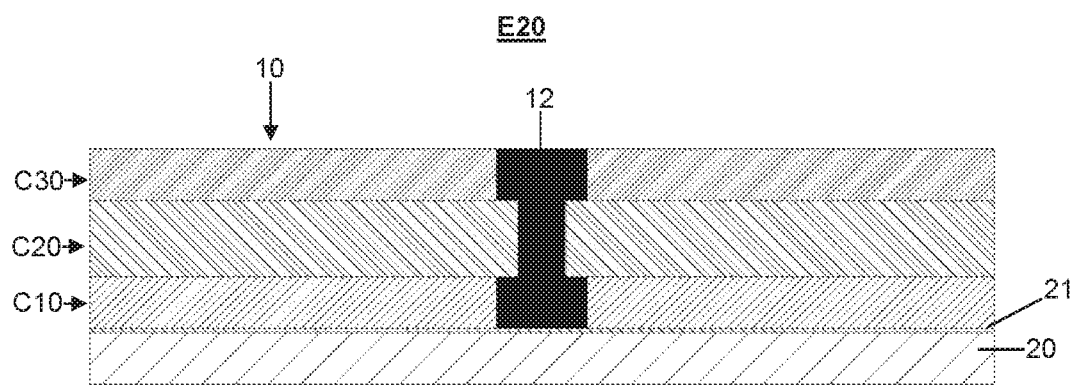
FIGS. 8 and 9 show a method in accordance with a first embodiment of the invention for manufacturing a horological component using the mould manufactured in accordance with FIGS. 1 to 7.

This substep E20 is preferably extended as far as filling all the height of the cavity 11 of the mould 10, as illustrated by FIG. 8, which has the advantage of enabling the growth in one piece of a metal or a metal alloy inside the three volumes formed by the openings 111, 112, 113 of the cavity 11 of the mould 10. Accordingly, unlike components resulting from the manufacturing methods of the patent applications EP2004881 and EP2405301, the horological component formed using the mould 10 results from a single and unique step of growing a metal or a metal alloy. Moreover, the horological component has on its functional surfaces a controlled definition, in particular surface state, corresponding to those of all or some of the surfaces of the cavity 11 of the mould 10.

Moreover, the resulting horological component preferably has the same height as that corresponding to the stack of the three layers C10, C20, C30 of the mould 10.

This substep E20 may optionally include finishing to thickness by simultaneous mechanical polishing of the metal layer and of the mould 10 to obtain a perfectly plane and horizontal upper surface, the surface state of which is satisfactory.

The method then includes a substep E21 of detaching the metal material 12 and its mould 10 from the substrate 20, for example by delamination of the layer 21 of the substrate.

Figure 9:
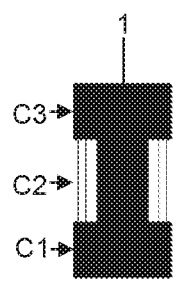

A final substep E22 finally enables separation of the horological component 1 formed by the deposition of metal in the cavity 11 of the mould 10 from the resin or resins forming the mould 10, for example by chemical attack or with the aid of a plasma. This therefore releases the horological component 1, as illustrated by FIG. 9.

A horological component 1 obtained in accordance with one example of the first embodiment described hereinabove is illustrated in more detail in FIG. 10. This horological component 1 is a shaft pinion and comprises three portions C1, C2, C3, respectively moulded in the three openings 111, 112, 113 of the cavity 11 of the mould 10 described above. The two end portions C1, C3 are similar cylinders of the same diameter and the same height arranged coaxially. An intermediate zone C2 forms a pinion integrated into the shaft formed by the cylinders of the portions C1, C3. This intermediate zone C2 is inscribed in the cylinder defined by extending the portions C1, C3. This intermediate zone C2 forms the pinion of the horological component 1 and is defined at the manufacture stage by the second volume formed by the second opening 112 in the second layer C20 of the mould 10, which therefore has a geometry corresponding to the pinion to be manufactured, in particular to the teeth to be formed. Moreover, this intermediate portion C2 has a section with an area less than that of the portions C1, C3.

A first advantage of the method described above for manufacturing the horological component 1 is to enable a multilevel horological component 1 to be formed in one piece, totally unitary and homogeneous. In the example it is formed in a single electroforming step, as opposed to the prior art methods based on distinct galvanic deposits or successive electroforming steps carried out separately layer by layer which generate a non-homogeneous multilayer structure comprising zones of weakness at the junction between the various layers of the finished horological component. On the other hand, it is noted that the functional part of the horological component 1, formed by the intermediate portion C2, has a contour perfectly defined by one or more surfaces of the cavity 11 of the mould 10 on the vertical lateral walls and likewise perfectly defined on its upper and lower longitudinal surfaces because they are delimited by the portions C1, C3 of the component, themselves precisely defined by one or more surfaces of the cavity 11 of the mould 10. Accordingly, there is no need for final reworking of the horological component 1 after leaving the mould to improve the definition, in particular the surface state, of the functional part of the portion C2. The method therefore enables a reliable horological component to be obtained in a simplified manner.

Note that the horological component has been described on the basis of galvanic deposition in the cavity 11 of the mould 10. Alternatively, the horological component may be made of some other material, such as a metal matrix or polymer matrix composite material. This horological component may moreover instead be formed by any method of filling the cavity of the mould other than galvanic deposition.

The invention is naturally not limited to the first embodiment described hereinabove. In accordance with a second embodiment, the method may include a step of adding an insert in at least a part of the cavity of the mould produced by a method similar to that described above, followed by a step of manufacturing a part of the horological component by filling a part of the cavity of the mould, in a similar manner to the first embodiment, enabling not only manufacture of said part of the horological component 1 but also securing it to the insert, thus forming a final horological component composed of the insert and of the part secured to the insert, that part gripping the insert. An insert of this kind is advantageously made of a material different from that of the part of the horological component produced by filling a part of the cavity of the mould.

This second embodiment will now be described in more detail.

In accordance with this second embodiment, the invention is also based firstly on a method for manufacturing a resin multilayer mould by photolithography that constitutes a first step E1' of the method in accordance with the second embodiment for manufacturing the horological component.

Figure 11:
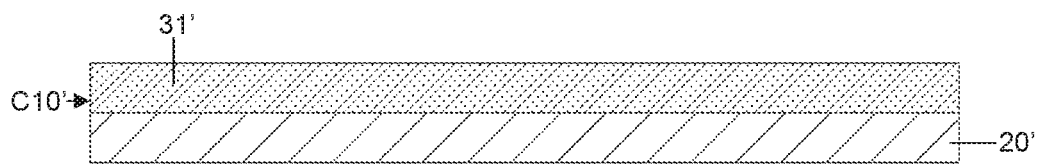
FIGS. 11 to 17 represent diagrammatically different steps of a method in accordance with a second embodiment of the invention for manufacturing a resin multilayer mould by photolithography for the manufacture of a horological component.

The two firsts substeps illustrated by FIG. 11 consist on the one hand in a substep E100' of procuring a substrate and on the other hand a substep E101' of producing a lower layer C10' of resin 31'. These two substeps are similar to the two first two substeps E10, E11 of the first embodiment and will not be described again. Note that in the example shown the substrate 20' does not include an optional intermediate layer 21.

Figure 12:
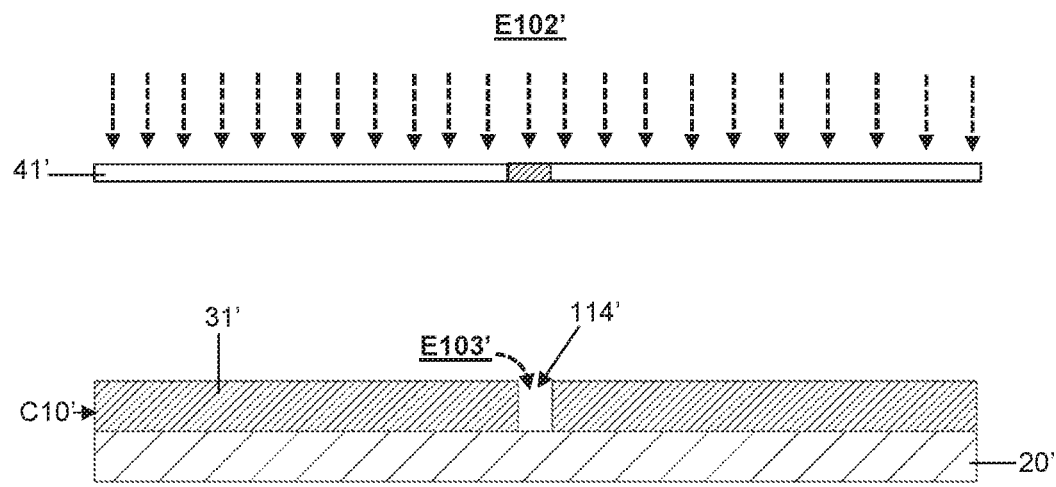

The method then includes two substeps E102', E103' illustrated by FIG. 12 that likewise correspond to the two substeps E12, E13 of the first embodiment and will not be described again. Following the above substeps, a bottom open opening 114' is formed in the inner layer C10' that will form a lower volume of the cavity of the future mould.

Figure 13:
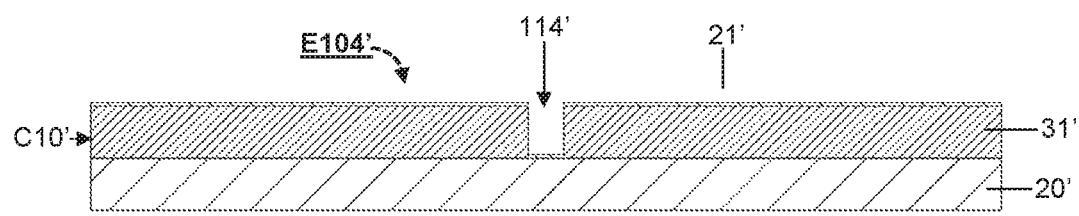

The method includes a fifth substep E104' of metallization of the upper surface of the lower layer C10' of the resin 31', as illustrated by FIG. 13. This substep consists more particularly in depositing a conductive layer 21' that is in particular intended to serve as an electrode for starting galvanic deposition, electrodeposition or electroforming, when executing the second step E2' that will be described later. In known manner, this starting conductive layer 21' may comprise a sublayer of chromium, nickel or titanium covered with a layer of gold or copper and can thus take the form of a multilayer structure. This conductive layer 21' covers not only the surface of this lower layer C10' but may also cover the bottom of the opening 114', that is to say the surface of the substrate 20' in the example shown, or even the flanks of the opening 114'.

Figure 14:
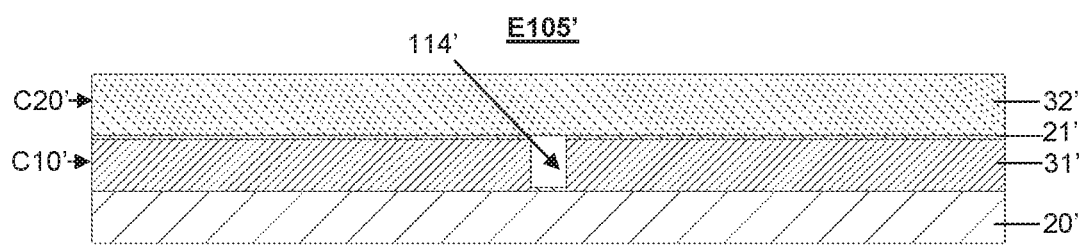

The method includes a sixth substep E105' illustrated by FIG. 14 that consists in forming a first layer C20' of a first photosensitive resin 32' on the conductive layer 21' to a required height.

This first resin 32' may take the form of a dry film that is applied, in particular by lamination, to the conductive layer 21'. This resin film may be for example a SUEX or ADEX film from DJ Microlaminates Inc. or a TMMF S2000 film from Tokyo Ohka Kogyo Co. These three films are negative resin films. Alternatively, this first resin 32' may be deposited to a required height, in accordance with the rules known to a person skilled in the art, for example by spin coating. Alternatively, the first resin 32' is of "SU-8" type which is a negative photosensitive resin that is polymerized by the action of UV radiation, for example the Microchem SU-8-100 resin.

Figure 15:
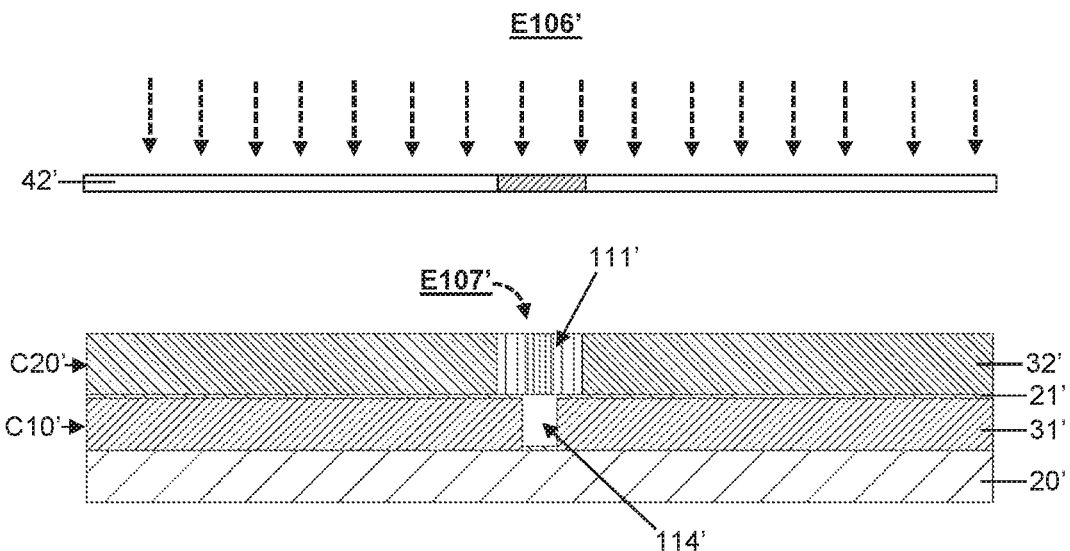

The method then includes two substeps E106', E107' illustrated by FIG. 15 that substantially correspond to the two substeps E18, E19 of the first embodiment. This enables a first through-opening 111' to be formed in the first layer C20', which will form a first volume of the cavity 11' of the mould 10', complementing the volume formed by the lower opening 114'.

Figure 16:
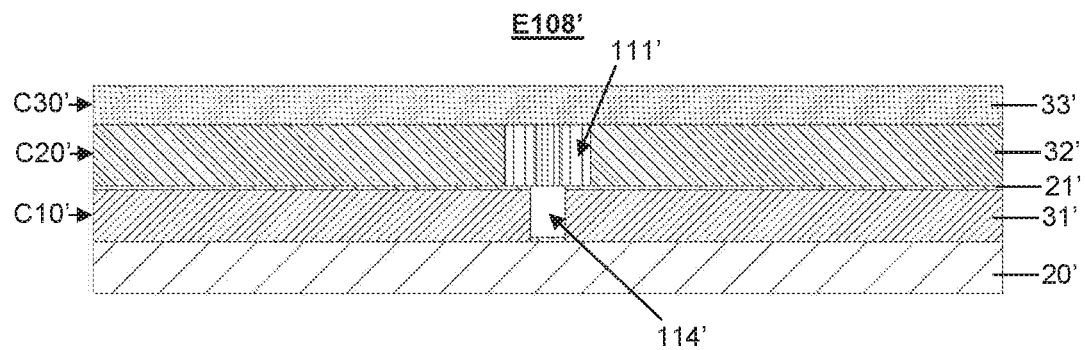

The method then includes a ninth substep E108' that consists in covering the first layer C20' of the first resin 32' with a second layer C30' of the second resin 33', as illustrated by FIG. 16.

This second resin 33' has the specific feature of taking the form of a dry film that is applied, in particular by lamination, to the second layer C20', so as to define a second layer C30' of the second photosensitive resin 33' of predefined height. Because of its rigidity, the use of a film of this kind advantageously enables precise positioning of the second resin 33' over the first opening 111' formed in the first layer C20', in particular in the vertical direction, as will be explained in detail hereinafter. A film of this kind is advantageously self-supporting, that is to say its geometrical integrity is assured by its rigidity alone. In other words, a film of this kind is rigid. The modulus of elasticity of a film of this kind is advantageously and more particularly between 2 and 5 GPa inclusive (at 20° C.). The thickness of the film may be between 100 μm and 1 mm inclusive.

Figure 17:
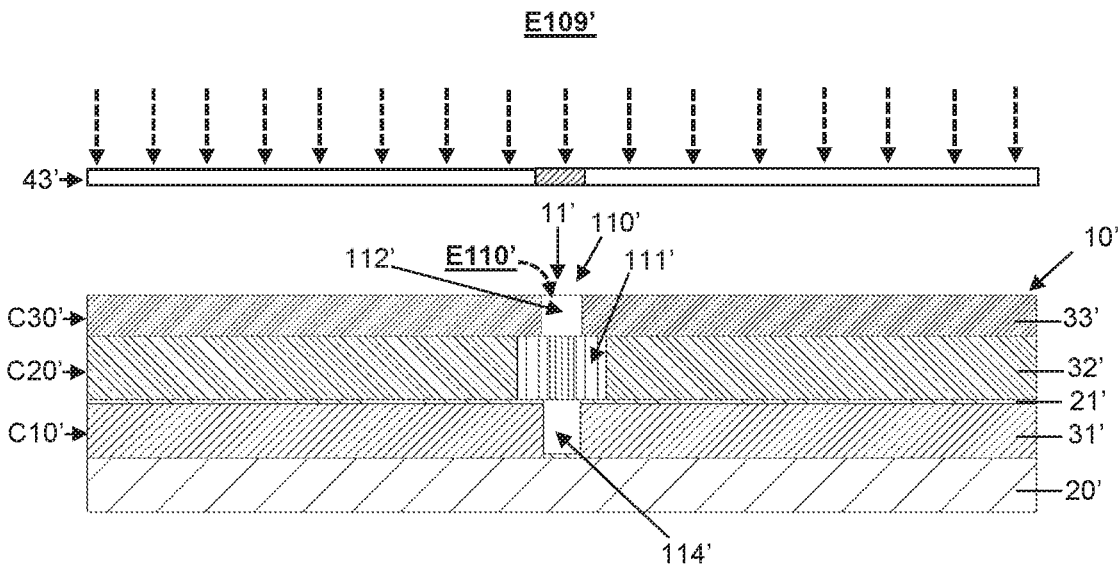

The method then includes two substeps E109', E110' illustrated by FIG. 17 that enable a second through-opening 112' to be formed in the second layer C30' in a similar manner to the two substeps E15, E16 of the first embodiment. It forms a second volume of the cavity 11' of the mould 10'.

Finally, the three openings 114', 111', 112' respectively form three volumes corresponding to the volume of a cavity 11' of a mould 10'. In other words, they are superposed, at least partly, to form a cavity 11'.

As in the first embodiment, the resulting geometry has the particular feature, that on the one hand the second through-opening 112' in the second layer C30' is superposed on the first through-opening 111' in the first layer C20' and on the other hand the resin second layer C30' partly covers this same first through-opening 111' in the first layer in resin. In other words, the contour of the second layer C30' at the level of the second opening 112' projects inside the vertical elevation of the contour formed by the first opening 111'. The second resin 33' has sufficient rigidity to support this position partly over the void at the level of the first opening 111'.

In the embodiment described the two superposed openings 111', 112' are centred, in particular coaxial. The second opening 112' has a section of smaller area than the section of the first opening 111'. Of course, in an alternative embodiment the two openings 111', 112' may be at least partially superposed without being centred.

The result of the steps E100' to E110' is a multilayer resin mould 10' comprising a cavity 11' having an inlet 110'. The volume of this cavity 11' corresponds to the three volumes respectively corresponding to the three openings 114', 111', 112' in the three layers C10', C20', C30' respectively.

The invention also relates to a method for manufacturing a horological component using the mould formed as above in accordance with the method for manufacturing a mould that forms the first step E1' of the method in accordance with this second embodiment of the invention for manufacturing the horological component.

In accordance with this second embodiment the method for manufacturing the horological component includes an intermediate step E3' of insertion of an element or of an insert in a part of the cavity of the mould followed by a second step E2' of filling a part of the cavity of the mould that is similar to the second step E2 of the first embodiment. The substeps of these manufacturing steps will now be described in detail hereinafter.

Figure 18:
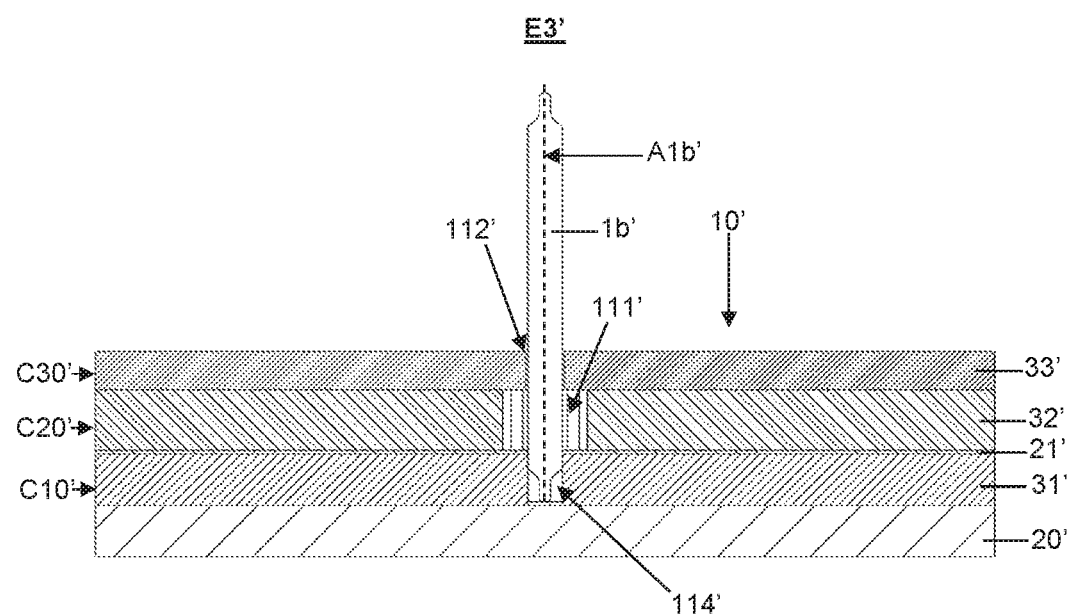
FIGS. 18 to 20 show a method in accordance with a second embodiment of the invention for manufacturing a horological component using the mould manufactured in accordance with FIGS. 11 to 17.

In accordance with the second embodiment shown a portion of an element 1b', a shaft in this example, is inserted through the three openings 112', 111', 114' of the mould 10', as illustrated by FIG. 18. To this end, the lower opening 114' of the lower layer C10' of the mould 10' preferably has a section having a format substantially equivalent to the format of a section of the inserted portion of the element 1b', in particular a circular section having a diameter substantially equivalent to the diameter of a section of the inserted portion of the element 1b'. This inserted shaft portion is preferably driven into this lower opening 114' so as to fit the shaft with less clearance in the cavity 11' of the mould 10' whilst the axis A1b' of the shaft is perpendicular to the plane of the substrate 20' in accordance with the prescribed assembly tolerances. This insertion by driving the shaft into the lower layer of resin 31' of "SU-8" type advantageously enables strong retention of the shaft for the remainder of the process.

In this embodiment, the inserted portion of the shaft 1b' further has a diameter equal to the diameter of a receiving portion 10b' of the shaft 1b' intended to receive the part 1a' to be produced afterwards, as will be described in detail later. Of course, these two portions of the shaft could have different diameters and/or shapes.

Moreover, in this embodiment, the shaft is driven in until it abuts against the substrate 20', in particular against a metal layer 21' on the substrate 20' created during the step E104'. Alternatively, the substrate 20' could have an opening under the lower opening 114' provided to allow a shaft portion to pass through, in particular a portion to guide the shaft, in particular a pivot of the shaft.

In this embodiment, the element 1b', which forms an insert in this method, is machined beforehand in its entirety before the intermediate step E3'. In other words, the element has a finished state when assembled into the mould 10' during the intermediate step E3'. Alternatively, it could have an intermediate state when it is assembled into a part of the cavity 11' of the mould 10' during the intermediate step E3' and be finished after the second step E2'.

Additionally, the second opening 112' in the second layer C30' also has a shape which substantially corresponds to the diameter of the element 1b'. Once this element 1b' has been disposed in a part of the cavity 11' of the mould 10' the first opening 111', which is disposed between the lower opening 114' and the upper opening 112' (that is to say the second opening), is virtually closed, ignoring the respective clearances defined between the element 1b' and these two openings 114', 112'. To be more precise, the first opening 111' is closed on its vertical lateral walls by the first layer C20', closed on its central vertical walls by the element 1b', closed on its longitudinal lower surface by the longitudinal upper surface of the lower layer C10' (more precisely the metallized layer 21' deposited on that lower layer C10') and on its longitudinal upper surface by the longitudinal lower surface of the second layer C30'.

Figure 22:
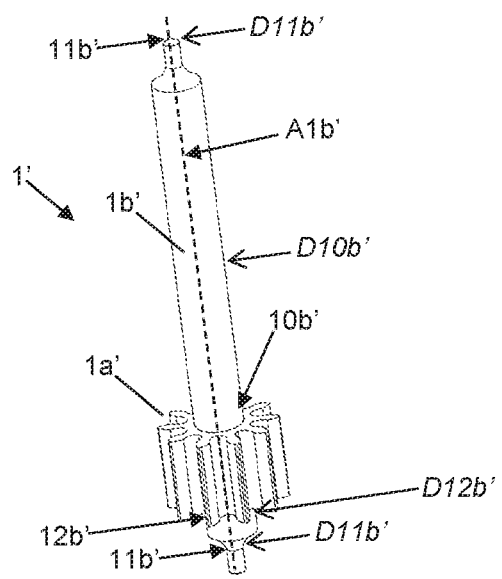
FIG. 22 represents specifically by way of example a horological component produced using the manufacturing method in accordance with the second embodiment of the invention.

The object of the second step E2' of the method is to form a part 1a' of a horological component 1' represented more particularly in FIG. 22 using a mould 10'. To this end a part of the volume of the cavity 11' of the mould 10', in particular a part of the first volume defined by the first opening 111', that is to say the volume of the cavity 11' not occupied by the element 1b', is filled with a material in a similar manner to the second step E2 of the first embodiment.

The horological component part 1a' may be made of metal or a metal alloy. Alternatively, this part 1a' may be made of a composite material, for example a composite material with a metal or polymer matrix.

In accordance with this embodiment, the second filling step E2' comprises the following substeps.

Figure 19:
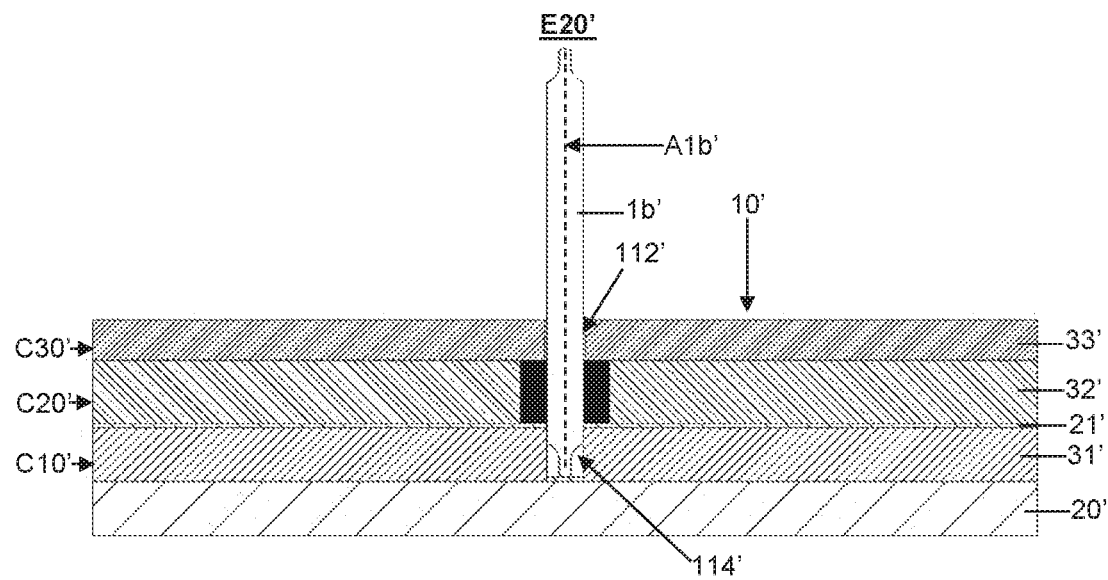

A first substep E20' illustrated by FIG. 19 consists in depositing a metal material in a part of the cavity of the mould 10' and therefore around the element 1b' by electrodeposition, electroforming or galvanic deposition. The resulting metal part electrodeposited or electroformed, in particular isotropically, has internal stresses such that it espouses and grips the element 1b' perfectly to enable retention of the future part 1a' of the horological component 1' on the element 1b'. Note that, in this example, the volume of the part of the cavity 11' of the mould 10' to be filled is limited to a part of the volume defined by the first opening 111', the rest of the volume being occupied by the inserted element 1b'.

In this substep the conductive layer 21' serves as a cathode for starting deposition. This step uses for example the LIGA process and a metal or a metal alloy such as for example nickel (Ni) or nickel-phosphorous (NiP). An alloy such as that described in the patent application WO2017102661 may advantageously be employed.

As mentioned in the case of the first embodiment, this substep E20' has the advantage of enabling growth of the part 1a' of the horological component 1' in one piece from a metal or a metal alloy. Moreover, this metal is formed over a height perfectly defined by the first layer C20'. As the part of the cavity of the mould formed by the first opening 111' is perfectly delimited on all of its surfaces, including the lower and upper surfaces, the part 1a' is formed with an excellent final surface state, including on its longitudinal surfaces. In particular, it is interesting to emphasize that the growth of a metal or of a metal alloy against the second layer C30' of the second resin enables an excellent surface state of the upper surface of the part 1a' to be obtained. Accordingly, the presence of the second layer C30' over a part of the first opening 111' yields a part 1a' of a horological component 1' the functional surfaces of which are perfectly controlled and finished, independently of any mechanical reworking.

The substep E20' may nevertheless optionally include a finishing step at the level of the junction between the element 1b' and the metal forming the part 1a'. This finishing step may for example be performed by means of a laser, in particular a femtosecond laser.

Figure 20:
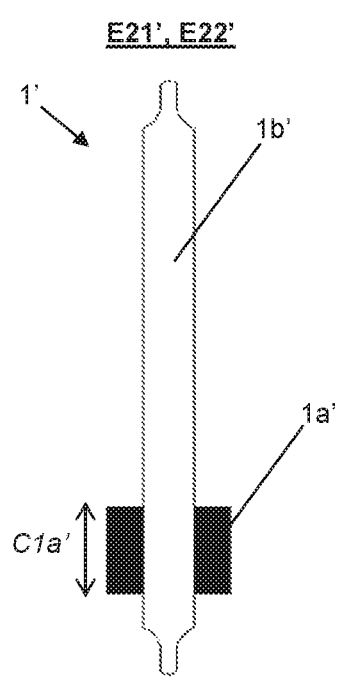

Finally, to achieve the result illustrated by FIG. 20 the method includes substeps E21', E22' of separation of the horological component 1' similar to the steps E21, E22 of the first embodiment, for example by chemical attack or with the aid of a plasma.

Figure 21:
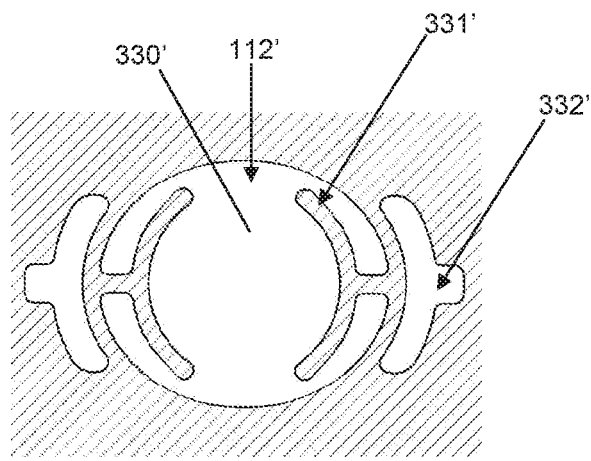
FIG. 21 represents a view from above of details of the manufacturing mould in accordance with a variant of the second embodiment of the invention.

The pattern 330' of the second layer C30' at the level of the second opening 112' illustrated by FIG. 21 may advantageously have an elastic structure 331'. A conformation of this kind advantageously enables the element 1b' to be centred and to be held perpendicular to the substrate 20', in particular to the lower layer C10' of the resin 31' in which the part 1a' is intended to be disposed.

Additionally or alternatively, the chosen pattern 330' is advantageously designed to define an adequate clearance between the element 1b' and the second layer C30' of the second resin 33' so as to enable the passage of the electrolyte in the first opening 111' during the second step E2'. This clearance represents a gap therefore constituting the inlet 110' of the cavity 11' of the mould. Alternatively or additionally, the pattern 330' may include one or more holes 332' to enable the passage of the electrolyte. Each hole is therefore part of the inlet 110' of the cavity 11' of the mould. Alternatively or additionally, the mould 10' may include one or more holes disposed in planes distinct from that of the pattern 330'. Each of these holes is also part of the inlet 110' of the cavity 11' of the mould.

This pattern 330' of the second layer C30' is formed during the substeps E109', E110' described above, consisting in exposing to luminous radiation or to light the second layer of resin 33' through a third mask 43' comprising openings and opaque zones. This mask therefore defines the pattern 330' to be reproduced to allow the passage of the electrolyte in the first opening 111' during the second step E2'.

Figure 23:
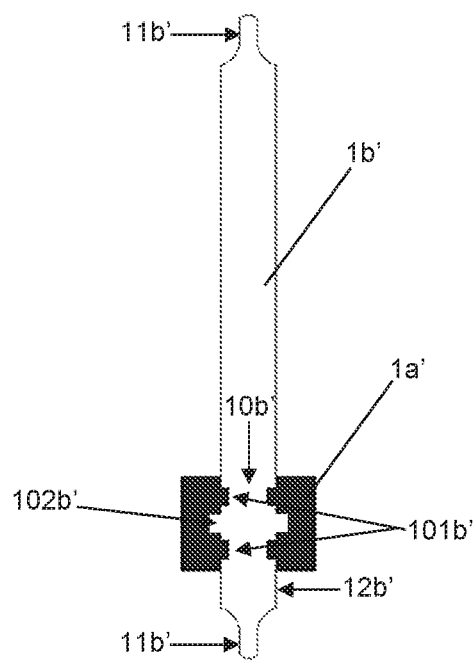
FIG. 23 represents by way of example the section of a horological component produced using the manufacturing method in accordance with a variant of the second embodiment of the invention.

Of course, the element 1b' may be specifically conformed to optimize the retention of the part 1a' on the element 1b', as illustrated by FIG. 23. For example, the shaft portion 10b' may include flutings 101b' that are designed to optimize the retention in torque of the pinion on the shaft. During the step E2' the metal comes for example to be accommodated in these flutings 101b'. Alternatively or additionally the shaft portion 10b' may include a bearing surface 102b' that is designed to maximize the axial retention of the pinion on the shaft. Alternatively or additionally the shaft portion 10b' may include a structured surface with the aim of locally increasing the roughness in order to optimize the retention of the pinion on the shaft.

A horological component 1' obtained in accordance with one example of implementation of the second embodiment described hereinabove is shown in more detail in FIG. 22. This horological component 1' is a shaft pinion. The shaft is formed by the aforementioned insert and the pinion corresponds to the part 1a' produced around a portion of the inserted shaft. The horological component 1' therefore advantageously includes a first part 1a', here a pinion, advantageously made of a first metal material and a second portion corresponding to the element 1b', here a shaft, made of a second material, preferably non-conducting and different from the first material.

Here the shaft of the horological component 1' passes completely through the pinion. The shaft may for example be manufactured from a non-conducting material, for example a ceramic, notably zirconia, in particular yttria-stabilized zirconia 3%, or monocrystalline alumina, or an alumina-zirconia combination.

Alternatively, the shaft of the horological component may be made from a composite material.

The shaft includes a portion 10b' to receive the pinion a section of which has a first diameter $D10b'$. The shaft advantageously also includes at least one portion 11b' for guiding the shaft pinion 1', preferably two guide portions 11b', in particular two pivots 11b', a section of which has a second diameter $D11b'$. The second diameter $D11b'$ is preferably less than or even very much less than the first diameter $D10b'$.

By virtue of the intrinsic properties of the ceramics cited above, which are extremely hard, the pivots of the shaft are not marked in the event of impacts. In the event of a strong impact these pivots will advantageously not be deformed, unlike steel pivots which can bend and therefore degrade the chronometry and/or the functionality of the horological movement. Moreover, ceramics offer the additional advantage of being particularly insensitive to magnetic fields and of not influencing the working of the timepiece when it is subjected to a magnetic field, in particular a magnetic field greater than 80 kA/m (1000G).

The first diameter $D10b'$ is preferably less than 2 mm, or even less than 1 mm, or even less than 0.5 mm, or even less than 0.3 mm, and the diameter $D10b'$ is preferably greater than 0.1 mm, or even greater than 0.2 mm.

The second diameter $D11b'$ is preferably less than 0.5 mm, or even less than 0.4 mm, or even less than 0.2 mm, or even less than 0.1 mm, or even less than 0.08 mm, and the second diameter $D11b'$ is preferably greater than 0.03 mm, or even greater than 0.05 mm.

More preferably, the ratio $D10b'/D11b'$ is between 2 and 8 inclusive, in particular between 3 and 6 inclusive.

Alternatively, the shaft could take the form of a cylinder including a portion 10b' to receive the pinion and be machined following the second step E2'. In particular, the guide portions 11b' could be machined afterwards.

Of course, the invention is not limited to the embodiments described. For example, the first part 1a' of the component 1' could include a plurality of portions disposed at different levels, like the component 1. Alternatively, the second part 1b' of the component 1' could take the form of an insert the total height of which is less than or equal to the total height of the part 1a' and could therefore be inscribed within the volume defined by the first part 1a'. As a further alternative, the part 1a' could constitute the entirety of the component 1'. In these latter two instances, the use of a lower layer C10' is not obligatory. In all these instances, at least one functional surface of all or part of the component 1' is perfectly defined by a second layer C30', in particular where its surface state is concerned.

It can advantageously enable the manufacture of any geometry of horological components and therefore of associated moulds.

Finally, the invention is based on a method for manufacturing a resin multilayer mould by photolithography for the manufacture of a horological component that includes the following substeps for manufacturing at least two resin layers of the mould:

Substeps for producing a first resin layer including a first through-opening or open opening oriented in the direction of the inlet of the cavity of the mould to delimit a first volume of the cavity of the mould;

Substeps for producing a second resin layer comprising a rigid film, said second layer including a second through-opening delimiting a second volume of the cavity of the mould, the second through-opening in this second layer being at least partly superposed on the first through-opening or open opening of the first layer and the second resin layer partly covering that same first through-opening or open opening in the first resin layer.

A method of this kind enables a mould to be obtained that includes:

A first resin layer including a first through-opening or open opening oriented in the direction of the inlet of the cavity of the mould delimiting a first volume of the cavity of the mould;

A second resin layer including a rigid film, said second layer including a second through-opening delimiting a second volume of the cavity of the mould, the second through-opening in this second layer being at least partly superposed on the first through-opening or open opening in the first layer and the second resin layer partly covering that same first through-opening or open opening of the first resin layer.

As described above, the second layer therefore includes a portion that comes over a part of an opening in a first lower layer. For this reason, it includes a resin comprising a rigid film, enabling it to retain a continuous and stable shape despite this particular configuration, which exerts forces on the free ends of the second layer suspended over a first opening in a first layer. To this end, the second resin layer may include the application of a resin including a dry film, in particular a SUEX or ADEX film from DJ Microlaminates Inc. or a TMMF S2000 film from Tokyo Ohka Kogyo Co. Naturally, any other resin film achieving satisfactory rigidity could be suitable. For example, a resin film of this kind advantageously has a rigidity characterized by a modulus of elasticity between 2 and 5 GPa inclusive (at 20° C.). Thus a film of this kind is advantageously self-supporting or rigid, that is to say its geometric integrity is assured by its rigidity alone. Additionally, the second layer advantageously has a thickness greater than or equal to 100 μm, advantageously between 100 μm and 1 mm inclusive.

The various other resins of the other layers may be identical or not to this resin of the second layer, as previously discussed above.

Naturally, the invention does not specifically relate to the design formed by the opening or openings. The latter may therefore be of cylindrical shape or of any other shape. Moreover, there may be one or more openings per layer. The mould could therefore include a plurality of cavities. The geometry of the openings is imposed by the horological component to be manufactured. Finally, the mould comprises at least two superposed layers, as described above, and could have three or more layers. It could therefore include a plurality of groups of two layers as described above with a plurality of resin layers comprising a rigid film similar to the second layer described hereinabove.

The invention also relates to a method for manufacturing a horological component that includes a first step of manufacturing a mould in accordance with the manufacturing method described above and a second step of at least partial filling of the cavity of the mould manufactured in the preceding step, in particular of filling the first and second volumes of said cavity of said mould, with an insert and/or a filling material, in order to manufacture all or part of the horological component.

The second filling step may include the insertion of an electrolyte through the inlet of the cavity of the mould and filling at least two openings in at least two respective layers of the mould so that the whole or part of the horological component electroformed in this way in said cavity of said mould is of unitary form (monobloc), in one piece, with no superposition of distinct layers.

In all cases, the second opening of the mould is at least partly superposed on the first through-opening or open opening in the first layer to form a continuous volume corresponding to the volume of the cavity of the mould and the second resin layer partly covers that same first through-opening or opening in the first layer.

By virtue of this particular structure of the mould in accordance with the invention in which the first step of manufacturing a mould includes the manufacture of a layer of the mould including a through-opening or an open opening oriented towards the direction of the inlet of the mould, partly covered by another layer, the lower and/or upper, longitudinal functional surfaces of all or part of the horological component obtained by the second filling step have a shape and in particular a surface state perfectly defined by a delimitation of a respective surface of the cavity of the mould. The horological component therefore advantageously has a very good surface state immediately on leaving the cavity of the mould.

Moreover, the method of the invention advantageously enables manufacture of a horological shaft including teeth. More advantageously, this shaft includes a non-metal portion griped by a pinion the upper and lower functional surfaces of which are perfectly defined by resin surfaces of the cavity of the mould and the surface states of which are perfectly controlled by surface states of the resin surfaces of the cavity of the mould.

Naturally, the method described above for manufacturing a horological component is not limited to the manufacture of a toothed shaft and may be used for the manufacture of horological components such as, by way of non-limiting illustrative example, a shaft with cam(s), a pivoted anchor (i.e. an anchor and its pivot pin), a pivoted balance (i.e. a balance and its pivot shaft).

The invention claimed is:

1. A method of manufacturing by photolithography a resin multilayer mould comprising a cavity provided with an inlet for the manufacture of a horological component, comprising producing at least first and second resin layers of the mould, comprising:
    producing the first resin layer comprising a first through-opening or open opening oriented in a direction of the inlet of the cavity of the mould to delimit a first volume of the cavity of the mould; and
    producing the second resin layer comprising a rigid film, the second resin layer comprising a second through-opening delimiting a second volume of the cavity of the mould, the second through-opening in the second resin layer being at least partly superposed on the first through-opening or open opening of the first resin layer and the second resin layer partly covering the first through-opening or open opening in the first resin layer,
    wherein the rigid film is made in a resin selected from the group consisting of a negative photosensitive dry film epoxy resin sold under the mark SUEX®, a chemically-amplified, i-line sensitive negative photosensitive dry film epoxy resin sold under the mark ADEX®, and a negative photosensitive dry film epoxy resin sold under the mark TMMF®.

2. The method according to claim 1, wherein the second resin layer has at least one property selected from the group consisting of:
    the second resin layer comprises a dry film;
    the second resin layer has a modulus of elasticity in a range of from 2 to 5 GPa inclusive;
    the second resin layer has a thickness greater than or equal to 100 µm;
    the second resin layer is self-supporting.

3. The method according to claim 1, wherein:
    the producing of the first resin layer comprises:
        depositing a first photosensitive resin;
        exposing the first photosensitive resin through a mask and developing the first photosensitive resin to form the mould comprising the first through-opening or open opening oriented in the direction of the inlet of the cavity of the mould to delimit the first volume of the cavity of the mould;
    the producing of the second resin layer comprises:
        depositing a second photosensitive resin comprising a dry film applied onto the first photosensitive resin;
        exposing the second photosensitive resin through a mask and developing the second photosensitive resin to form the cavity of a mould comprising the second through-opening.

4. The method according to claim 3, wherein, in the depositing of the second photosensitive resin comprising a dry film, the second photosensitive resin comprising a dry film is laminated onto the first photosensitive resin.

5. The method according to claim 1, wherein the second through-opening in the second resin layer is centered on the first through opening or open opening in the first resin layer.

6. A method of manufacturing a horological component, comprising:
    manufacturing a mould by the method according to claim 1, and
    filling at least partially the cavity of the mould in order to manufacture all or part of the horological component.

7. The method according to claim 6, wherein the at least partial filling of the cavity of the mould comprises filling all or part of the cavity of the mould by electrolysis.

8. The method according to claim 7, wherein the at least partial filling of the cavity of the mould comprises inserting an electrolyte through the inlet of the cavity of the mould and filling at least two openings of two respective layers of the mould so that all or part of the horological component thus electroformed in the cavity of the mould is formed as one piece, without superposition of distinct layers.

9. The method according to claim 7, wherein the filling of all or part of the cavity of the mould is by electroforming, comprising circulating an electrolyte through the inlet of the cavity of the mould.

10. The method according to claim 6, wherein the manufacturing of the mould comprises producing the first resin layer of the mould comprising the first through-opening or open opening oriented in the direction of the inlet of the cavity of the mould, partly covered by the second resin layer, the first through-opening or open opening of the first resin layer forming a first volume of the cavity of the mould defining all or part of the horological component to be manufactured so that a lower functional surface and/or an upper functional surface of all or part of the horological component produced by the at least partial filling of the cavity of the mould has or have a shape.

11. The method according to claim 10, wherein the lower functional surface and/or the upper functional surface of all or part of the horological component produced by the at least partial filling of the cavity of the mould has or have a respective surface state defined by a delimitation of a surface of the cavity of the mould.

12. The method according to claim 6, comprising:
   providing an opening in at least one of the layers of the mould, the opening having a format corresponding to an element to be inserted, and
   inserting an element in the opening so as to retain the element during the at least partial filling of the cavity of the mould so as to produce a part of the horological component surrounding the element.

13. The method according to claim 12,
   wherein the manufacturing of the mould comprises producing the first resin layer as a lower layer comprising the first opening as a lower opening, the second resin layer as a second upper layer comprising the second opening as an upper opening centered on the lower opening of the lower layer, and a first intermediate layer between the lower layer and the upper layer,
   wherein the first intermediate layer comprises a first intermediate through-opening centered on the openings in the lower layer and the upper layer, a transverse cross-section of the first intermediate through-opening of the first intermediate layer having a surface area greater than respective surface areas of transverse cross-sections of the lower and upper openings in the lower layer and the upper layer, the first intermediate through-opening forming a cavity portion of the mould, and
   wherein the at least partial filling of the cavity of the mould enables the manufacture of the horological component comprising a part surrounding the element inserted in the mould.

14. The method according to claim 13, comprising coating the lower layer of the mould with a metal layer, wherein the at least partial filling of the cavity of the mould comprises filling by electroforming.

15. The method according to claim 13, comprising providing the second opening in the second upper layer of the mould, the second opening having a format substantially corresponding to the element in order to guide and/or to retain the element, wherein the second upper layer has at least one property selected from group consisting of:
   the second upper layer is conformed to retain the element elastically during the at least partial filling, the second opening comprising a pattern forming an elastic structure;
   the second upper layer is conformed to enable passage of material filling the cavity of the mould, by having at least one feature selected from the group consisting of:
      a pattern forming a structure comprising at least one hole in the second upper layer of the mould, the at least one hole being part of the inlet of the cavity of the mould;
      a structure defining a clearance in a vicinity of a position of the element after insertion.

16. The method according to claim 13,
   wherein the element is a substantially cylindrical shaft so that the at least partial filling of the cavity of the mould enables the part of the horological component to be formed as a pinion surrounding the shaft,
   wherein upper and lower functional surfaces of the pinion are defined by resin surfaces of the mould during the at least partial filling of the cavity of the mould, so as to form the horological component being a horological shaft comprising teeth.

17. The method according to claim 16, wherein the element is a substantially cylindrical ceramic shaft and the pinion is made of metal, the shaft comprising at least one feature selected from the group consisting of:
   at least one bearing surface in a vicinity of the pinion to maximize axial retention of the pinion on the shaft,
   at least one fluting to maximize retention in torque of the pinion on the shaft;
   differences of roughness between the shaft and the pinion, to favour attachment of the pinion to the shaft.

18. The method according to claim 12, wherein the element is inserted in the second through-opening of the second resin layer and in the first through-opening or open opening of the first resin layer of the mould.

19. The method according to claim 6, comprising filling the first and second volumes of the cavity of the mould.

20. The method according to claim 1, wherein the resin multilayer mould is adapted for the manufacture of a multilevel horological component selected from the group consisting of shafts with teeth, shafts with cams, pivoted anchors, and pivoted balances.

21. A resin multilayer mould comprising a cavity having an inlet, produced by photolithography, for manufacturing a horological component, the mould comprising:
   a first resin layer comprising a first through-opening or open opening oriented in a direction of the inlet of the cavity of the mould, delimiting a first volume of the cavity of the mould;
   a second resin layer comprising a rigid film, the second resin layer comprising a second through-opening delimiting a second volume of the cavity of the mould, the second through-opening in the second resin layer being at least partly superposed on the first through-opening or open opening in the first resin layer and the second resin layer partly covering the first through-opening or open opening of the first resin layer,
   wherein the rigid film is made in a resin selected from the group consisting of a negative photosensitive dry film epoxy resin sold under the mark SUEX®, a chemically-amplified, i-line sensitive negative photosensitive dry film epoxy resin sold under the mark ADEX®, and a negative photosensitive dry film epoxy resin sold under the mark TMMF®.

22. The resin multilayer mould according to claim 21, wherein the resin multilayer mould is adapted for the manufacture of a multilevel horological component selected from the group consisting of shafts with teeth, shafts with cams, pivoted anchors, and pivoted balances.

\* \* \* \* \*